United States Patent [19]
Witherspoon et al.

[11] Patent Number: 5,252,105
[45] Date of Patent: Oct. 12, 1993

[54] METHOD OF FORMING LEAD-ACID BATTERY ELECTRODE

[75] Inventors: Romeo R. Witherspoon, Shelby Township, Oceana County; Gregory C. Garabedian, Warren, both of Mich.

[73] Assignee: General Motors Corporation, Detroit, Mich.

[21] Appl. No.: 957,303

[22] Filed: Oct. 6, 1992

[51] Int. Cl.$^5$ .................................... H01M 10/38
[52] U.S. Cl. .................... 29/623.1; 29/623.5; 423/559; 423/619; 429/218; 429/225; 429/227; 429/228
[58] Field of Search ............... 429/218, 225, 227, 228; 29/623.1, 623.5; 423/559, 619

[56] References Cited
U.S. PATENT DOCUMENTS

| | | | |
|---|---|---|---|
| 633,249 | 9/1899 | Rathier | 429/245 |
| 4,388,210 | 7/1983 | Parker | 429/228 X |
| 4,637,966 | 1/1987 | Uba et al. | 429/57 |
| 4,713,304 | 12/1987 | Rao et al. | 429/136 |
| 5,106,709 | 4/1992 | Tekkano et al. | 429/210 |

FOREIGN PATENT DOCUMENTS 63-170854  7/1988  Japan .

OTHER PUBLICATIONS

D. Pavlov et al, J. Electrochem Soc., vol. 131, No. 7, 1984.
D. Pavlov et al, J. Electrochem Soc. vol. 137, No. 1, 1990.
Chemical Abstract Selects: Batteries & Fuel Cells, #24, 1988.

*Primary Examiner*—Prince Willis, Jr.
*Assistant Examiner*—M. Muzzolillo
*Attorney, Agent, or Firm*—Lawrence B. Plant

[57] ABSTRACT

In a preferred method, an electrode for a lead-acid battery is prepared in a new continuous process without the conventional curing step. The general procedure for preparing electrodes includes preparing a mixture (paste) comprising an active material precursor and an inhibitor. The active material precursor includes lead oxides having at least 10% by weight lead oxide in the form of $Pb_3O_4$ (red lead), and a BET surface area of at least about 0.8 m$^2$/gram; desirably about 1.00 to 1.50 m$^2$/gram and preferably about 1.0 to 1.25 m$^2$/gram. The inhibitor prevents formation of tribasic lead sulfate and tetrabasic lead sulfate from the precursor material, except at elevated temperature. The paste is applied to electrode grids and reacted at elevated temperatures for between about 5 and about 30 minutes, to form the active material of the electrode for both positive and negative electrodes. Plates are then assembled into batteries and charged. Negative electrodes differ from the positive, mainly in the additives used.

21 Claims, 6 Drawing Sheets

METHOD OF FORMING LEAD-ACID BATTERY ELECTRODE

FIELD OF THE INVENTION

This invention relates to electrodes of lead-acid batteries and to a method of their manufacture.

BACKGROUND OF THE INVENTION

Automotive type lead-acid batteries have interlaced positive and negative electrodes, also called plates. Each plate consists of special material, known as active material, supported on lead-alloy grids. The active material is formed from lead oxide pastes which are processed to a firm, porous form.

In the preparation of plates for a lead-acid battery, a mixture is formed containing oxides of lead, a significant amount of metallic lead, sulfuric acid, water, and various additives. As a result of chemical reaction during mixing, a portion of the mixture is initially converted to lead sulfate ($PbSO_4$), providing an active material precursor paste which includes lead and its oxides and sulfates.

The precursor paste is applied to conductive lead grids and, using conventional methods, the freshly pasted plates are then typically cured to stabilize the precursor material and to enhance the strength of the plates. Both positive and negative plates are made by the same basic process except for the selection of additives.

Typically, negative plates are cured for up to three days in a highly humid and warm air atmosphere to oxidize the free lead. Positive plates are cured by steam at near 100° C. for 3 hours. Plates are assembled in the battery and formed in a multi-stage process which involves charging at a relatively high rate in several stages, each lasting several hours.

The curing steps of current processes are time consuming and often lead to irregular product quality because such curing often fails to fully oxidize lead. The achievement of being essentially lead-free (i.e. fully oxidized product) is a key feature of a high quality product.

Therefore, it is desirable to have a new process for preparing electrodes which produces a more consistent and lead-free product.

SUMMARY OF THE INVENTION

There is provided an electrode for a lead-acid battery, formed in a continuous process without steaming and curing.

The general procedure for preparing electrodes includes preparing a mixture (paste) comprising an active material precursor, sulfate-containing acids, and an inhibitor. The active material precursor includes lead oxides having at least 10% by weight lead oxide in the form of $Pb_3O_4$ (red lead), and a BET surface area of at least about 0.80 $m^2$/gram; desirably about 1.00 to about 1.50 $m^2$/gram, and preferably about 1.0 to about 1.25 $m^2$/gram. The inhibitor prevents formation of tribasic lead sulfate and tetrabasic lead sulfate from the precursor material and sulfate-containing acids, except at elevated temperatures. The paste is applied to electrode grids and reacted at elevated temperatures for between about 5 and about 30 minutes, to form the active material of the electrode for both positive and negative electrodes. Plates are then assembled into batteries and charged. Negative electrodes differ from the positive, mainly in the additives used.

More specifically, the lead sulfates at non-elevated temperatures are predominantly monobasic lead sulfate, $PbO.PbSO_4$ ($nPbO.PbSO_4, n=1$). At moderately high temperatures, tribasic lead sulfate ($3PbO.PbSO_4$) forms; and tetrabasic lead sulfates ($4PbO.PbSO_4$) forms with further processing at temperatures of about 80° C. to about 100° C. Typically, the tri-($n=3$) and tetra-($n=4$) basic lead sulfates form, rather than dibasic lead sulfate ($n=2$).

An important aspect of the invention is the use of a lead sulfate derived from red lead in which the surface area is maximized through control of acid stoichiometry and reaction conditions. The lead sulfate derived from red lead is actually a mixture of $PbO_2$, $PbO$, and $PbO.PbSO_4$. It has been found that the surface area is maximized where the stoichiometry is near the monobasic lead sulfate point ($PbO.PbSO_4$). That is, a ratio of $PbO/PbSO_4$ of about 2, providing about one mole equivalent sulfate ($SO_4$) for every two moles equivalent of lead (Pb). The maximum surface area at this same stoichiometry is obtained through the controlled reaction of 50% sulfuric acid with a red lead, preferably by absorbing the acid on a diatomaceous earth material (Celite 503) prior to adding the red lead. Good results are obtained when at least a minimum amount of red lead, at least down to about 10 weight percent, is used.

Objects, features and advantages of this invention are an electrode for a lead-acid battery and method of making it which improves consistency of product, essentially eliminates hard-to-control curing steps, prevents blistering of plates, and enhances plate strength.

These and other objects, features and advantages will become apparent from the following description of the preferred embodiments, appended claims and accompanying drawings.

DETAILED DESCRIPTION OF THE PREFERRED EMBODIMENTS

Figure 1:
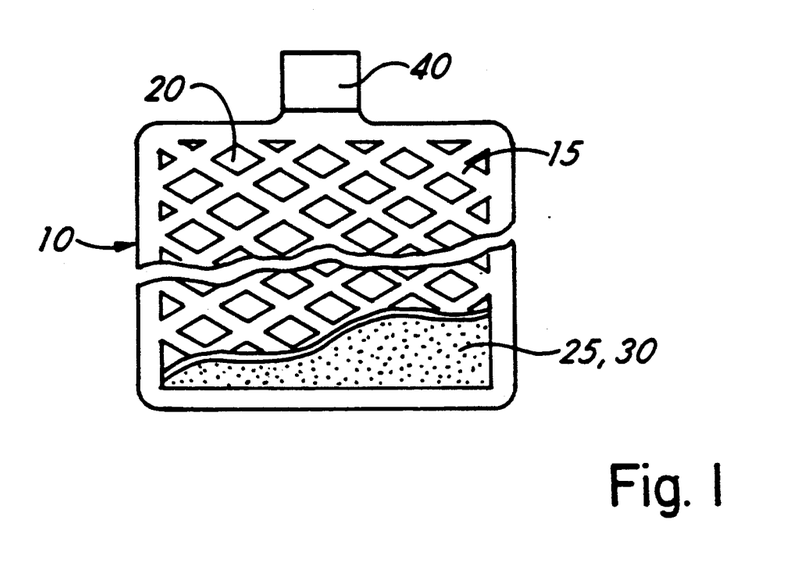
FIG. 1 is a schematic drawing of an electrode for a battery.

FIG. 1 shows a schematic drawing of an electrode 10 for use in a lead-acid battery. The electrode has a lead-based alloy substrate 15 which is in the form of a grid with recesses 20. The substrate grid 15 has surface oxides of lead. A coating 25, comprising an active material 30, is applied to both sides of the grid 15. In FIG. 1, only one side has active material. A tab 40 provides a terminal.

Electrodes 10 were made from standard production grids 15 available from Delco-Remy. These grids 15 are of a typical 1% tin alloy with a minor amount of calcium. A grid for a positive electrode 10 is of a 1% tin, 0.05% to 0.07% calcium lead-alloy, with a thickness of about 0.043" (0.109 cm). Electrode grids of about 11.6 cm$^2$ were made. The active area of the grid consisted of about 12 diamond-shaped sections at the lower end of the test electrode. Larger, full-sized electrodes were 264 cm$^2$. Smaller electrodes were used primarily for screening purposes.

The general procedure for preparing electrodes includes preparing a mixture (paste) comprising an active material precursor and an inhibitor. The active material precursor includes lead oxides having at least 10% by weight lead oxide in the form of Pb$_3$O$_4$ (red lead), and a surface area of at least about 0.8 m$^2$/gram. Desirably, the red lead (Pb$_3$O$_4$) content of the lead oxide is about 5 to about 30 weight percent, and preferably about 7.5 to about 15 weight percent. Desirably, the BET surface area of the lead oxide, having the desired red lead content, is about 0.80 to about 1.50 m$^2$/gram, and preferably about 1.0 to about 1.25 m$^2$/gram. The inhibitor prevents formation of tribasic lead sulfate and tetrabasic lead sulfate from the precursor material, except at elevated temperature, typically in excess of 80° C. The paste is applied to electrode grids and reacted at elevated temperatures in a range of about 80° C. to about 100° C. for between about 5 and about 30 minutes, to form the active material of the electrode for both positive and negative electrodes. Plates are then assembled into batteries and charged. Negative electrodes differ from the positive, mainly in the additives used.

The inhibitor facilitates a two-stage reaction process. In a first stage, discreet lead sulfate or basic lead sulfate is prepared. These compounds may be prepared from either lead oxide or red lead. The lead sulfate of the first stage is subsequently reacted with more lead oxide in the second stage to form the tribasic or tetrabasic sulfate in the electrode plate. More specifically, the lead sulfates prepared in the first stage are predominantly the monobasic lead sulfate, PbO.PbSO$_4$ (nPbO.PbSO$_4$, n=1). This is then reacted in the second stage process to form tribasic lead sulfate (3PbO.PbSO$_4$) at relatively moderate temperatures, or tetrabasic lead sulfates (4PbO.PbSO$_4$), with further processing at temperatures of about 80° C. to about 100° C. Typically, the tri-(n=3) and tetra-(n=4) basic lead sulfates form, rather than dibasic lead sulfate (n=2).

It has been found that under certain conditions, lead sulfate forms slowly from lead oxide and sulfuric acid. Thus, the monobasic sulfate is formed as the stable first stage material. Ordinarily, these reactions take place quite rapidly in conventional pasting procedures with sulfuric acid. In contrast, in the method of the invention, the transition from monobasic to tribasic lead sulfates is retarded by the presence of inhibitors which block the surface of the lead oxide until activated by heat. This process permits the crystals of tribasic lead sulfate to develop in the pasted plate, rather than in the paste mixer, and to give better plate strength.

An important aspect of the invention is the use of a lead sulfate derived from red lead in which the surface area is maximized through control of acid stoichiometry and reaction conditions. The lead sulfate derived from red lead is actually a mixture of PO$_2$, PbO, and PbO.PbSO$_4$. It has been found that the surface area is maximized where the stoichiometry is near the monobasic lead sulfate point (PbO.PbSO$_4$). That is, a ratio of PbO/PbSO$_4$ of about 2, providing about one mole equivalent sulfate (SO$_4$) for every two moles equivalent of lead (Pb). The maximum surface area at this same stoichiometry is obtained through the controlled reaction of 50% sulfuric acid with a red lead, preferably by absorbing the acid on a diatomaceous earth material (Celite 503) prior to adding the red lead. Good results are obtained when at least a minimum amount of red lead, at least down to about 10 weight percent, is used. As shown from the following examples, the use of red lead sulfate with maximized surface area, enhances formation of the positive plates and very probably eliminates blistering after the plate is formed. The use of hydroxyl-containing organic or inorganic reaction inhibitors controls the course of the two-stage chemical reactions which take place in the formation process (pasting process), and gives better plate strength. Desirably, the hydroxyl-containing compound is a polyhydroxyl organic compound, and preferably is glucose, fructose or sorbitol.

The various lead oxides and reagents used are as shown in Table 1. The preferred active material formed from red lead is prepared by one of several preferred methods, as described in the examples. The active material precursor was applied to grids which were not pretreated to form surface oxides. If desired, oxidized grids could be used.

EXAMPLE 1

Figure 2:
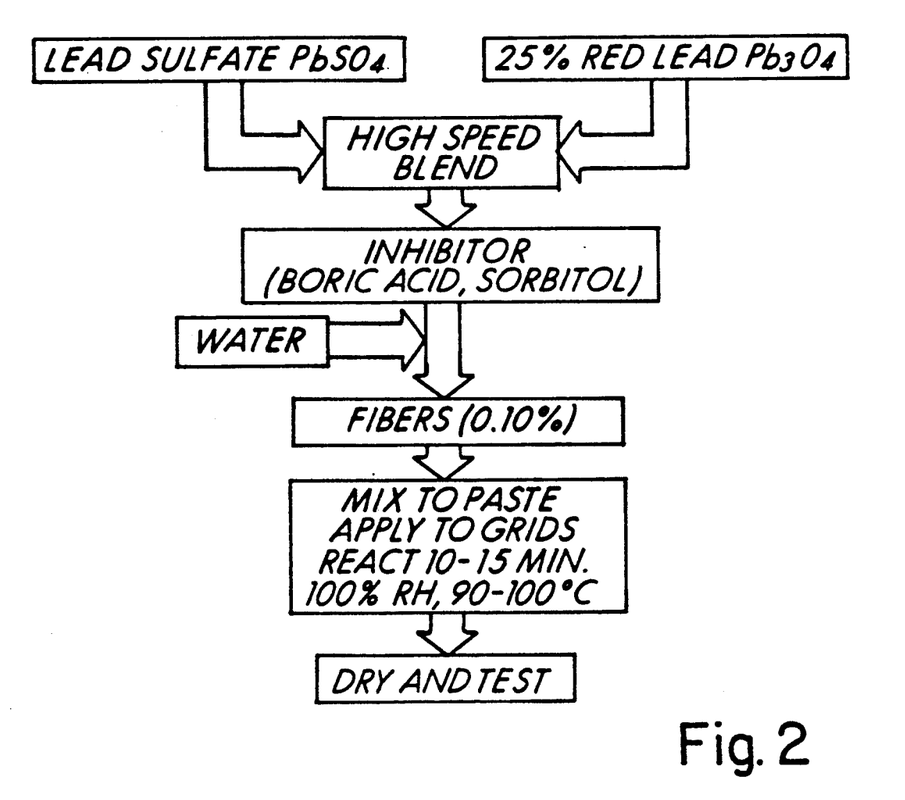
FIG. 2 is a flow diagram showing some of the important steps of a process according to one aspect of the invention.

Lead sulfate pastes were made by combining red lead (a lead oxide having 25% by weight Pb$_3$O$_4$) with 10% by weight of J. T. Baker lead sulfate in a high speed blender. The resulting dry powder was then mixed with the appropriate amount of water along with the selected inhibitor, typically boric acid or sorbitol (see Table 1). The resulting paste was applied to the grids and heated in a humid atmosphere in unsealed metal foil envelopes for about 10 to about 15 minutes at about 100° C., removed from foils and dried. The plates were then assembled in a battery and charged. The general flow diagram for this process is shown in FIG. 2.

EXAMPLE 2

Figure 3A:
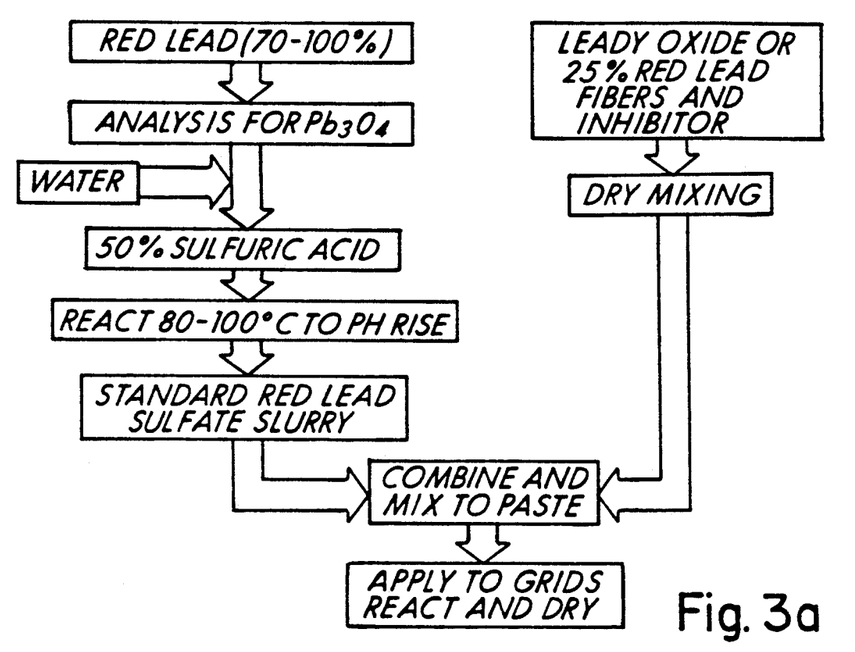
FIGS. 3(a), 3(b), 4, and 5 are flow diagrams showing some of the important steps of other alternative processes of the invention.

In this example 75% red lead (75% Pb$_3$O$_4$) was reacted with sulfuric acid in the presence of sufficient water to form the desired paste consistency in the final stage when more lead oxide was added. The amount of sulfuric acid was varied from the stoichiometric point to slightly more than the amount needed to give monobasic lead sulfate (PbO.PbSO$_4$) For each lot of 75% red lead it was necessary to titrate for the exact analysis since it was found that the actual amount of red lead in the lead oxide was closer to 71%, rather than the stated 75%. The acid-water-lead oxide mixture was heated to about 75° C. to 80° C., with vigorous stirring for a period of 2 hours, or until the pH rose above 5. The resulting product had a thick, creamy consistency and was light brown in color. Electrodes were made by weighing the proper amount of the mixture so as to give a 10% by weight PbSO$_4$ paste when added to the selected lead oxide or red lead oxide and inhibitor, as shown in FIG. 3(a). The inhibitor improved viscosity and retarded hardening of the pastes. The applied pastes were heated at a temperature of about 80° C. to about 100° C., for about 20 minutes to about 25 minutes, in a humid (100% relative humidity) atmosphere as per Example 1, and then assembled into a battery.

EXAMPLE 3

Figure 3B:
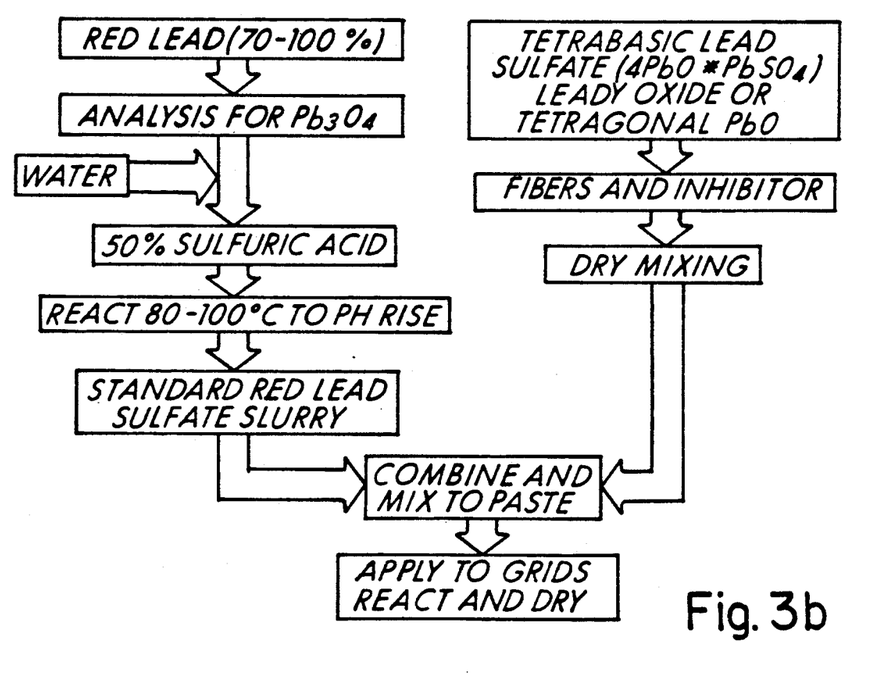

A variation of the pasting process of Example 2 used a two-part paste in which 50% to 70% by weight of the paste was tetrabasic lead sulfate for plate stability, and the remainder was from the paste-mix described above and shown in FIG. 3(a). This process is shown in FIG. 3(b).

Comparative Tests

In comparative tests, pastes made from 25% red lead (25% $Pb_3O_4$) and lead sulfate pastes, rapidly turned to a grainy consistency with very poor plasticity, making it almost impossible to paste on grids. Increasing the water content caused cracking of dried electrodes, as was seen in previous work. In contrast, the use of 1% boric acid or other inhibitors, preferably organic inhibitors, as in Examples 1 and 2, gave smooth pastes stable for a minimum of 30 minutes.

Small and large electrodes made by the method of the examples were tested. Small electrodes were evaluated either against gassing lead counter electrodes with a lead sponge reference electrode, or in small trielectrode cells with two small Delco Remy negative counter electrodes. Most of the preliminary screening tests were run with gassing counter electrodes in a large excess of electrolyte. Normally, 1.280 acid (37 w/o) was used as the electrolyte. Small electrodes were most commonly formed at the two hour rate with a 25% excess charge above the theoretical amount. Discharge was at the same current density as for formation. If small complete cells were used, the same procedure was used with the exception that the electrolyte contained Formax (phenolsulfonic acid) at 3 to 5 ml/gallon to help negative formation. Full-sized positives were always evaluated in polyethylene "baggy" type cells against two Delco-Remy production negative electrodes retained by plexiglass plates. Daramic separators (silica filled polyethylene) were used around the positive electrodes. In the present work, production Delco-Remy negatives were preformed over a 16 hour period to about 25% of the theoretical capacity and then assembled into the test cell with the positives, formed as per the examples. The test cell was then formed over a 5 hour period at constant current to 125% of the positive theoretical capacity. The discharge was at a 2 hour rate to 1.75 V. Normal charge during cycling was at a 5 hour rate with a voltage lid of 2.65 V. In all cases, the full capacity of the electrodes was removed (100% depth of discharge). Cycling was normally terminated at 20% of theoretical.

Figure 7:
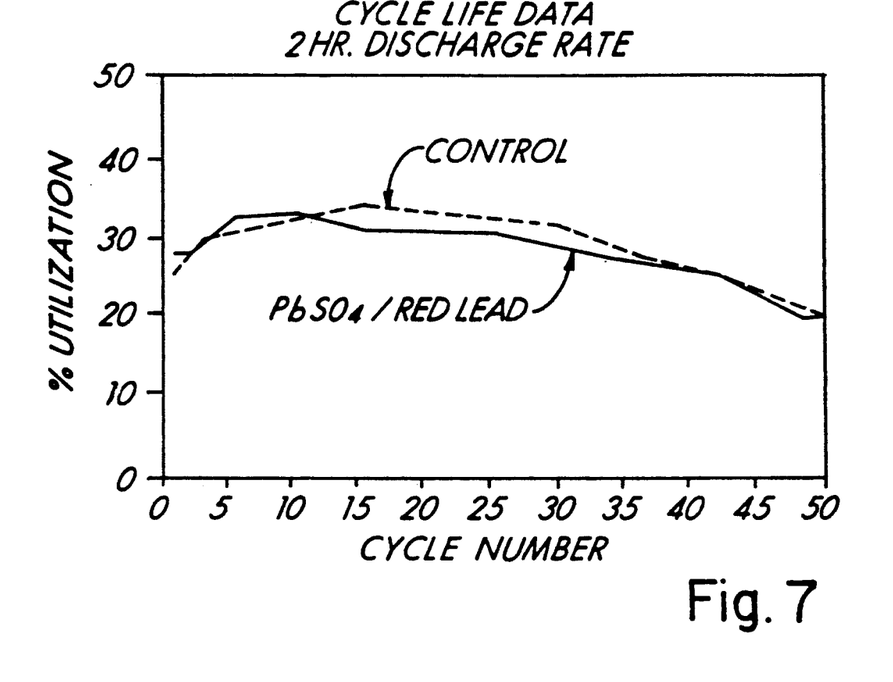
FIGS. 7, 8, 9, and 10 are diagrams of percent utilization as a function of battery cycles.

Plates made with the inhibited paste, by the process of Examples 1 and 2, were strong and gave good cycling results, as seen in FIG. 7. In contrast to conventional methods, the pastes of Examples 1 and 2 were applied and heated, only. There was no conventional curing step. After heating, the plates were assembled into a battery and charged.

TABLE 1

| Material | Condition/Processing | BET Area $m^2/g$ |
| --- | --- | --- |
| 1. Litharge | As received, rhombic PbO | 1.00 |
| 2. Tetragonal PbO | Made from 1 by water + heat | 1.00 |
| 3. $PbSO_4$ | Made from 2 by water + $H_2SO_4$ | 0.99 |
| 4. Lead oxide (PbO.Pb) | As received leady oxide (25% Pb) | 1.08 |
| 5. Delox lead oxide (PbO.Pb) | As received leady oxide | 1.18 |
| 6. Red lead | As received 25% to 75% $Pb_3O_4$ | 1.00 |
| 7. Red lead sulfate from #6 (71% $Pb_3O_4$) | Stoichiometric acid/PbO ratio | 3.00 |
| 8. Same as #7 | PbO/Acid ratio 2/1 (PbO/$H_2SO_4$) | 4.1 |
| 9. Same as #7 | PbO/Acid ratio 2.25/1 | 5.2 |
| 10. Celite 503 | As received[5] | 1.29 |
| 11. Same as #9 | Acid absorbed on Celite | 6.28 |
|  | Actual area corrected for Celite | 7.20 |
| 12. Boric acid powder | $H_3BO_3$ |  |
| 13. Sorbitol | $C_6H_6(OH)_6$ |  |
| 14. Ammonium sulfate | $(NH_4)_2SO_4$ |  |
| 15. Ammonium bicarbonate | $NH_4HCO_3$ |  |
| 16. Sulfuric acid reagent | $H_2SO_4$ |  |
| 17. Formax | Phenolsulfonic acid |  |
| 18. Polypropylene fibers | ¼" chopped fibers |  |
| 19. Positive electrode grids | 1% Sn, 0.05 Ca Std Dr |  |

NOTES:
1. Source of material for nos. 1 and 6 is Hammond Lead Co.
2. Source of material for no. 4 is Fitzgerald Co.
3. Source of material for nos. 5, 17, 18, and 19 is Delco-Remy division of General Motors.
4. Source of material for nos. 12–16 is J. T. Baker Chem. Co.
5. Celite 503 is a flux-calcined diatomaceous earth porous silicate formerly sold by the Manville Corp., and now sold by the Celite Corp.

In various tests, it was shown that the surface area of lead dioxide ($PbO_2$), derived from red lead could be maximized by controlling the amount of residual PbO in the lattice through treatment with nitric acid, rather than sulfuric acid as in Example 2. The condition of red lead treated with either nitric acid or sulfuric acid was similar. Using sulfuric acid, good results were observed by controlling stoichiometry.

From Table 1, items 6–9 and 11, it is seen that the surface area of the acid treated red lead goes through a maximum. Although not precisely determined, it appears that the highest surface area takes place at a $PbO/H_2SO_4$ ratio of 2.25 and slowly decreases thereafter. This coincides with conditions needed to maintain an initial composition near the monobasic sulfate. Then the remaining reaction to the tribasic will take place at a later stage when the electrodes have been pasted. The highest surface area was obtained in material #11, where the reaction was controlled by pre-absorbing the acid in Celite 503. The surface area optimization effect is seen only with red leads containing more than 50% $Pb_3O_4$. It is important that each lot of red lead be analyzed to make sure the actual red lead content is matched to the proper amount of acid.

Another important factor is the order of addition of the reaction inhibitor. If the inhibitor is added to the red lead before the addition of the sulfuric acid, the surface area of the product may be reduced by as much as 50%. It is, therefore, important that the inhibitor always be added after the formation of the red lead sulfate.

It should be noted that the treatment of plain lead oxide with sulfuric acid did not produce the same effect as did red lead, and surface area did not vary with stoichiometry. Thus, red lead is the preferred starting material.

Figure 8:
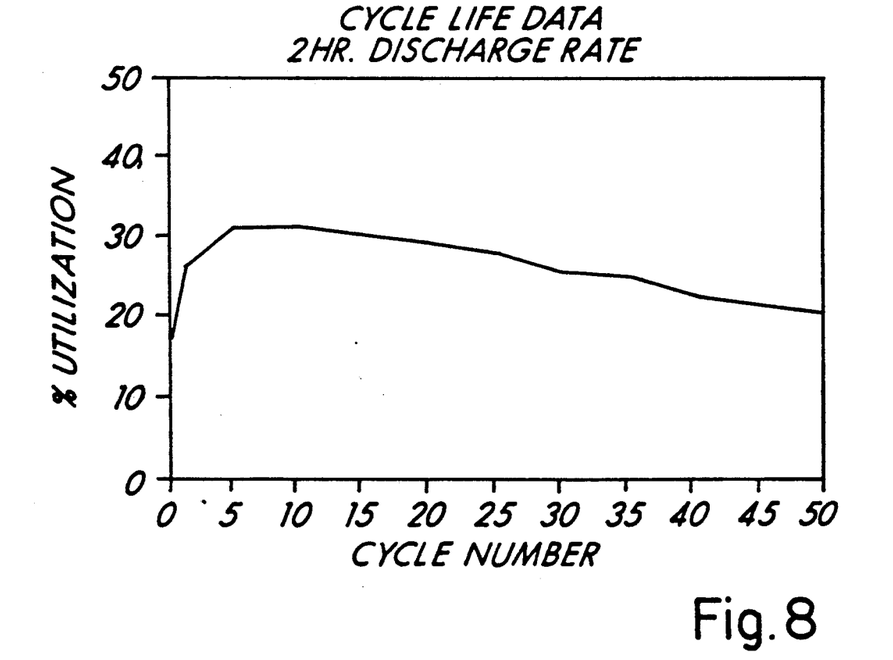

A large number of plates, both negative and positive, have been made by the method of Example 2, as shown in FIG. 3(a). Most of the electrodes made with this process used either a 1% boric acid inhibitor or a 0.25% sorbitol inhibitor. A major portion of the plates in this example were designed with 10% lead sulfate level, red lead content of 15% to 17%, and inhibitors selected from boric acid, sorbitol, fructose, glucose or other simple sugars. Positive plates made by this method gave good cycling results, as shown in FIG. 8, when compared with conventional positive plates.

EXAMPLE 4

The method of Example 2 was used except that the 25% red lead was replaced with ordinary leady oxide. When not fully cured to remove the free lead, leady oxide normally gives blistered positive plates in conventional electrodes. The plates made by the method of Example 2 did not show this blistering, and the cycle life of plates made with pure 25% red lead or leady oxide are essentially the same.

EXAMPLE 5

Figure 4:
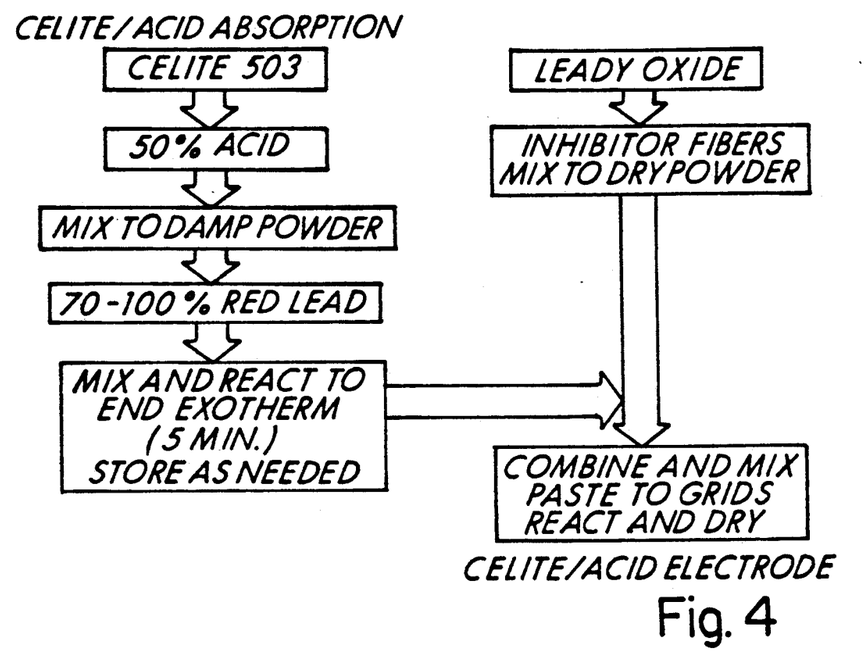
Figure 9:
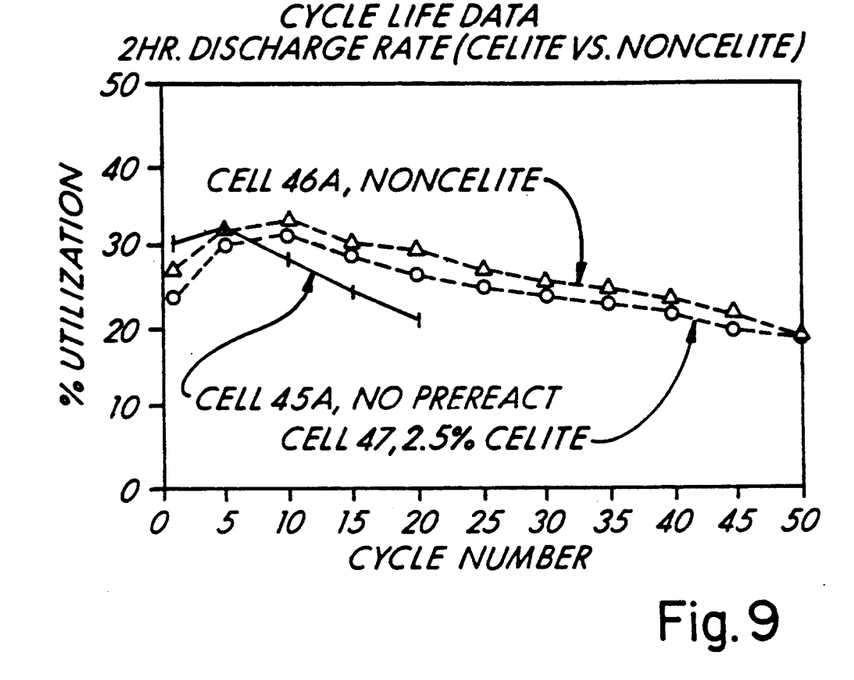

Plates were made by a modification of the process of Example 2, as shown in FIG. 4. In this case, the acid was pre-absorbed by the Celite and then reacted with the red lead. The resulting plates appeared somewhat stronger than those of Example 2 (non-Celite plates), and showed comparable utilizations and life as shown in FIG. 9. An additional benefit of the Celite was the lower loss of the positive active material at the end of battery life. Pasted plates without the Celite showed 20 grams or more active material loss after 50, C/2 rate cycles, whereas the Celite-containing plates lost only 5 to 6 grams.

The amount of Celite which could be used in the plates to improve the plate properties was only up to about 3% by weight. Anything above this level tended to reduce the density of the plates too much or lower the strength of the plate. Another problem with the Celite in any of its available forms is the iron content, i.e. about 1% ferric oxide. Small amounts of iron are known to reduce both the hydrogen and oxygen over voltages at the negative and positive electrodes, respectively. The iron could be removed by acid treatment with HCl, but this would increase the cost significantly. There are other forms of porous ceramics available which have very high liquid absorption values as alternatives to Celite.

EXAMPLE 6

Figure 5:
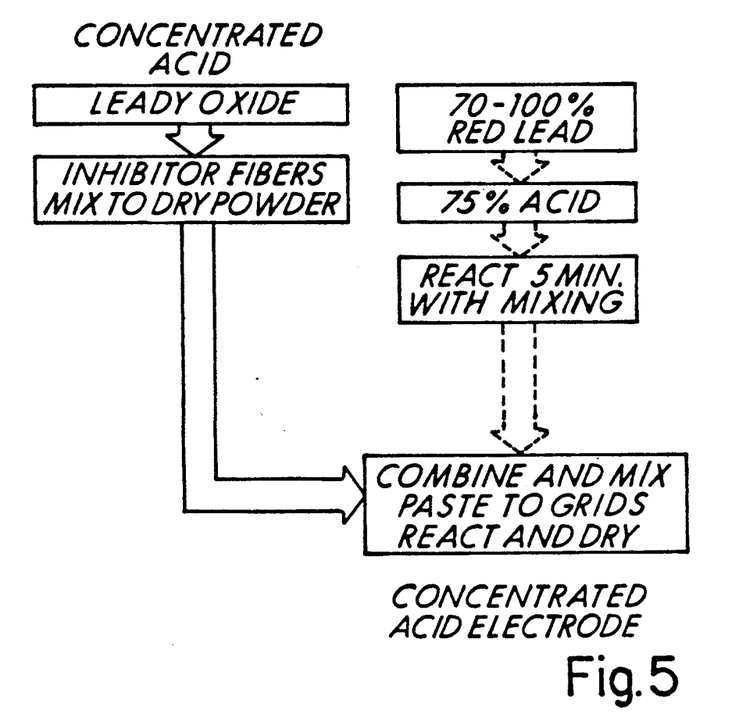

A finely powdered red lead sulfate was obtained by a modification of Example 5, in which the acid concentration was increased by restricting the amount of water used prior to reaction with sulfuric acid. Although 50% acid gives a granular and essentially non-usable product, increasing the acid concentration to 75% gives a finely divided material which can be used to make electrodes with good physical and electrochemical properties. Lots of 200 grams $Pb_3O_4$ were treated with 40 grams of 75 w/o sulfuric acid in a mixer at an acid addition rate such that the heat evolution was not excessive. The reaction was extremely rapid and completed within 5 minutes. The process is shown in FIG. 5. The resulting product was stable and could be stored for long periods of time until it is reacted with lead oxide, water, and inhibitor to make the desired paste.

Figure 10:
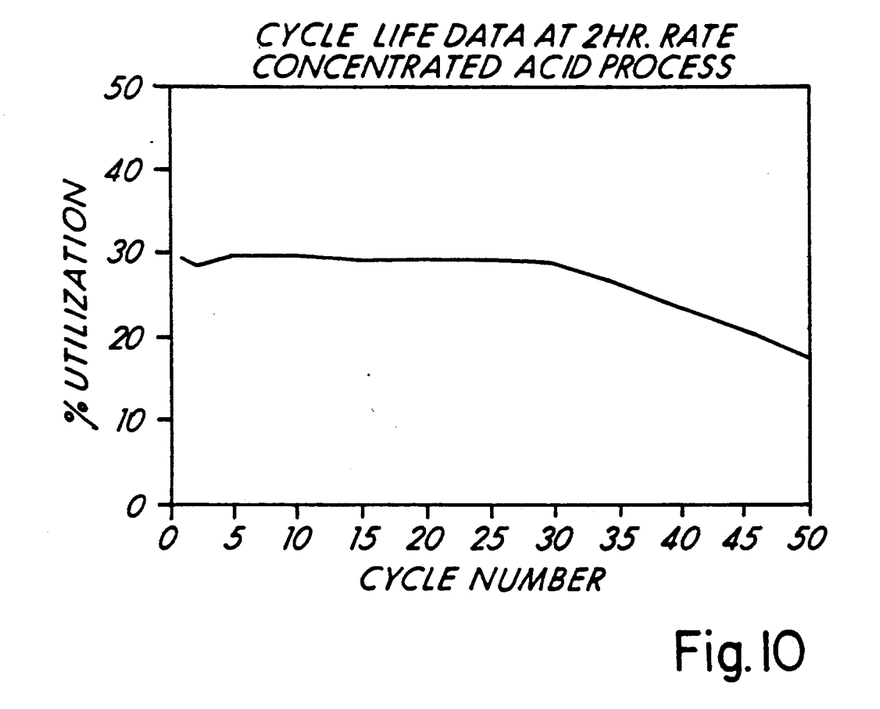

The typical cycling results for electrodes made by the concentrated acid method (Example 6, FIG. 5) of preparing red lead sulfate are shown in FIG. 10. The cycling results were similar to other data with the exception that the capacity was relatively flat for about 30 cycles, rather than reaching a maximum and then slowly decreasing. The initial utilization was quite good in spite of the fact that the surface area of the red lead sulfate made by the concentrated acid method was only in the 3 to 4 $m^2$/gram range. It may well be that areas as high as the 6 to 7 $m^2$/gram seen with the Celite methods are not necessary. The most important factor to be considered in preparing the red lead sulfate is that there should be no agglomeration of the crystals which gives non-uniform electrodes with poor strength.

EXAMPLE 7

Figure 6A:
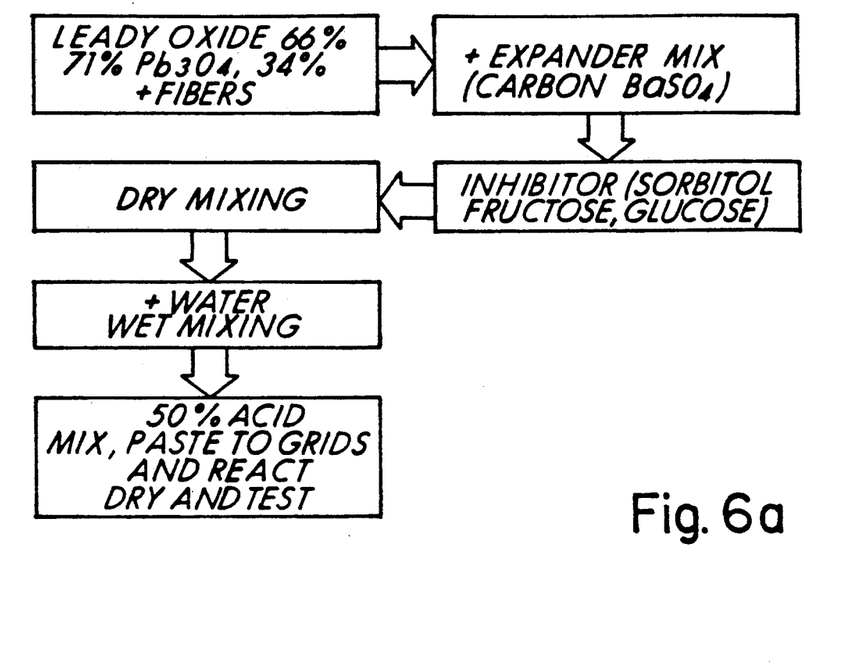
FIGS. 6(a) and (b) are flow diagrams showing some of the important steps of an alternative process of the invention for forming negative plates.
Figure 6B:
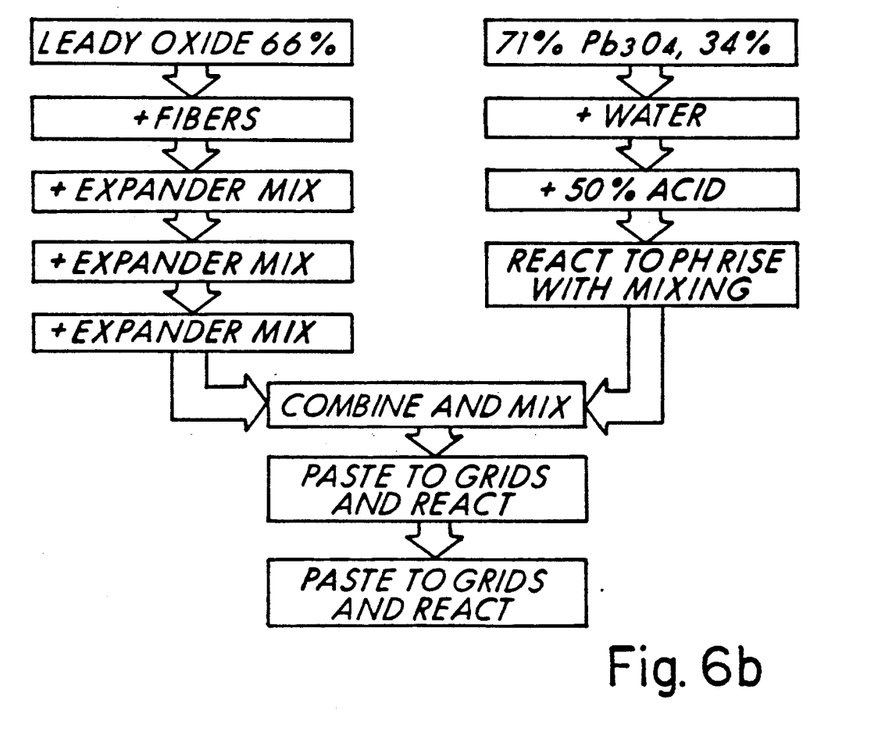

Negative plate pastes were made by slight modifications to the positive plate procedures, primarily by addition of an expander. Plates were then reacted in open foil envelopes similar to the positives. These processes are shown in FIGS. 6(a) and 6(b). As shown in FIG. 6(a), 25% red lead by weight, derived from 75% red lead, was added to the dry ingredients and processed. In another variation (FIG. 6(b)), the red lead was prereacted with the acid in a large lot followed by the addition of the lead oxide, expander, inhibitor, and polymer fibers. This method was used to make both positives and negatives from a single lot. Positives are made first, and to the remaining part of the mix, an expander is added for the negatives.

Tests showed that the negatives made by the process of FIG. 6(a) gave cycling results essentially the same as those with conventional negatives. Negatives made by the process shown in FIG. 6(b) have also been shown to give good cycling properties. While process FIG. 6(b) is more complicated then 6(a), 6(b) process is the preferred one because the electrodes are stronger.

Comparative Tests—Negative Plates

Negatives were made using leady oxide and with all ingredients combined at the beginning. The sulfuric acid was added last and the paste applied to the grids. These did not form or cycle well. There were large areas of unconverted lead sulfate, and capacities were lower than that of plates made as shown in FIGS. 6(a) and 6(b).

Thirty full-sized positive and negative plates, made according to the invention, were evaluated in full-sized 9 plate cells consisting of 5 positive and 4 negative plates. Positive plates were made by the method of Example 2 with leady oxide as the major component and with boric acid inhibitor. Negative plates were made by the process in FIG. 6(a) also using leady oxide and a boric acid inhibitor. All cells were given a standard 130Ah/lb formation. The cell capacities were all within acceptable limits for the first 25A rate tests, but showed poor results when given a cold cranking test at 0° F. This was due to the effects of the boric acid inhibitor in the negative electrodes. When boric acid was replaced with sorbitol or one of the other simple sugars, good results were obtained.

The inhibitors used in the Examples have at least one hydroxyl group per carbon atom. Preferably, they are simple sugars and related compounds. Boric acid and ammonium bicarbonate were also used as inhibitors, although the organic polyhydroxyl compounds are preferred. Best results were obtained using organic compounds where most of the carbon atoms have hydroxyl groups attached. Linear molecules are preferred. Random ketone, aldehyde or carboxyl groups are acceptable, unless there is reaction to form acetic acid, which will ruin the positive electrode of the battery. Good results were obtained with sorbitol, mannitol, fructose, glucose, and even sucrose. There are many other polyhydroxyl compounds which will work as well, including optical and geometrical isomers of simple sugars and their acids. The simple sugars such as glucose and fructose, as well as sorbitol, are preferred since they are low in cost. They are effective in the 0.05 to 0.50 w/o range, and in the preferred range 0.10 to 0.25 w/o. While specifically added as a reaction inhibitor in positive pastes, the polyhydroxyl compounds appear to improve the negative electrode as well. The surface area of the lead on cycling is in the range of 1.0 to 1.34 m$^2$/gram with the sorbitol and a maximum of only 0.79 m$^2$/gram without sorbitol.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A method of forming an electrode plate for a lead-acid battery comprising:
   a) forming an oxide of lead having at least 10% by weight lead oxide in the form of Pb$_3$O$_4$ (red lead);
   b) forming a wet mixture containing basic lead sulfate (nPbO.PbSO$_4$) predominantly in the monobasic form (PbO.PbSO$_4$) by reacting the oxide of step (a) with one or more acids containing a sulfate group in an amount sufficient to provide at least one mole equivalent of sulfate (SO$_4$) for every two moles equivalent of lead (Pb) in the oxide of step (a);
   c) forming an oxide of lead having less than 1% by weight lead in the form of free lead;
   d) intermingling the mixture formed in step (b), the oxide of step (c), and an inhibitor having at least one hydroxyl group;
   e) applying the product of step (d) to grids; and
   f) heating the applied product and at a temperature and at a humidity sufficient to react the monobasic lead sulfate to form at least one of tribasic lead sulfate (3PbO.PbSO$_4$) and tetrabasic lead sulfate (4PbO.PbSO$_4$).

2. The method according to claim 1, wherein the temperature is 80° C. to about 100° C.

3. The method according to claim 1, wherein the time is less than 5 minutes for a negative electrode and between about 10 and 15 minutes for positive electrodes.

4. The method according to claim 1, wherein the heating takes place in an atmosphere essentially saturated with water (100% relative humidity).

5. The method according to claim 1, wherein the acid is selected from the group consisting of sulfuric acid and ammonium sulfate.

6. The method according to claim 1, wherein step (d) is accomplished by first intermingling the oxide of step (c) and the inhibitor and then including the mixture formed in step (b).

7. The method according to claim 1, wherein the inhibitor is selected from the group consisting of hydroxyl-containing organic and inorganic compounds.

8. The method according to claim 1, wherein the inhibitor is selected from the group consisting of glucose, fructose and sorbitol.

9. The method according to claim 1, wherein the lead oxide of step (a) has a surface area of at least about 1.0 m$^2$/gram.

10. The method according to claim 1, wherein step (b) is conducted by causing the acid to be absorbed by ceramic particles and then mixing the ceramic particles with the oxides of step (a), whereby the acid reacts with the oxide.

11. A method of forming an electrode plate for a lead-acid battery comprising:
    a) forming a wet mixture comprising basic lead sulfate (nPbO.PbSO$_4$) predominantly in the monobasic form (PbO.PbSO$_4$), at least one oxide of lead and an inhibitor having at least one hydroxyl group;
    b) applying the mixture of step (a) to a support substrate; and
    c) heating the applied mixture for a time and at a temperature and at a humidity sufficient to react the monobasic lead sulfate to form at least one of tribasic lead sulfate and tetrabasic lead sulfate.

12. The method according to claim 11, wherein before step (a) the basic lead sulfate is formed by reacting an oxide of lead having at least 10% by weight lead oxide in the form of Pb$_3$O$_4$ (red lead) with one or more acids containing a sulfate group in an amount sufficient to provide at least one mole equivalent of sulfate (SO$_4$) for every two moles equivalent of lead (Pb).

13. The method according to claim 12, wherein the oxide of lead having at least 10% by weight lead oxide in the form of Pb$_3$O$_4$ has a surface area of at least about 1.0 m$^2$/gram.

14. The method according to claim 12 and further comprising causing the acid to be absorbed by ceramic particles and then mixing the ceramic particles with the oxide, whereby the acid reacts with the oxide.

15. The method according to claim 12, wherein the acid is selected from the group consisting of sulfuric acid and ammonium sulfate.

16. The method according to claim 11, wherein at least one oxide of lead is selected from the group consisting of leady oxide (PbO/Pb), lead oxide (PbO), and an oxide of lead having at least 10% by weight lead oxide in the form of Pb$_3$O$_4$ (red lead).

17. The method according to claim 11, wherein the temperature is 80° C. to about 100° C.

18. The method according to claim 11, wherein the heating takes place in an atmosphere essentially saturated with water (100% relative humidity).

19. The method according to claim 11, wherein before step (a) the basic lead sulfate is formed by reacting lead sulfate (PbSO$_4$) with an oxide of lead having at least 25% by weight lead oxide in the form of Pb$_3$O$_4$ (red lead).

20. The method according to claim 19, wherein the oxide of lead having at least 25% by weight lead oxide in the form of Pb$_3$O$_4$ has a surface area of at least about 1.0 m$^2$/gram.

21. The method according to claim 11, wherein the inhibitor is selected from the group consisting of glucose, fructose, and sorbitol.

* * * * *